United States Patent [19]

Flores, Sr.

[11] Patent Number: 5,730,424
[45] Date of Patent: Mar. 24, 1998

[54] APPARATUS FOR SENDING A LINE THROUGH A CONDUIT

[75] Inventor: Reuben Michael Flores, Sr., San Antonio, Tex.

[73] Assignee: Fli Line Tool Corporation, San Antonio, Tex.

[21] Appl. No.: 422,174

[22] Filed: Apr. 14, 1995

[51] Int. Cl.⁶ .................................................. B65H 59/00
[52] U.S. Cl. ......................................................... 254/134.4
[58] Field of Search ...................... 254/134.4, 134.3 FT, 254/134.3 R; 137/1, 13, 808, 813, 828

[56] References Cited

U.S. PATENT DOCUMENTS

| | | |
|---|---|---|
| 178,545 | 6/1876 | Merriam. |
| D. 291,044 | 7/1987 | Canning. |
| 423,134 | 3/1890 | Cope. |
| 443,823 | 3/1890 | Cope. |
| 979,899 | 12/1910 | Steigleder. |
| 1,969,199 | 8/1934 | Battles. |
| 1,999,559 | 4/1935 | Brendlin. |
| 2,470,338 | 5/1949 | Chilton. |
| 2,685,874 | 8/1954 | Ford. |
| 3,006,607 | 10/1961 | Hamrick. |
| 3,034,766 | 5/1962 | Hamrick. |
| 3,119,600 | 1/1964 | Bitter. |
| 3,179,375 | 4/1965 | Hamrick. |
| 3,244,402 | 4/1966 | Ensley. |
| 3,244,403 | 4/1966 | Ensley. |
| 3,246,878 | 4/1966 | Hamrick. |
| 3,301,531 | 1/1967 | Corsiglia. |
| 3,669,087 | 6/1972 | Hamrick et al.. |
| 3,689,031 | 9/1972 | Ruddick et al.. |
| 3,793,732 | 2/1974 | Hamrick. |
| 3,837,624 | 9/1974 | Dandurand. |
| 3,886,972 | 6/1975 | Scott et al.. |
| 3,927,866 | 12/1975 | Linquist. |
| 4,043,537 | 8/1977 | Russo, Jr.. |
| 4,083,533 | 4/1978 | Schwabe. |
| 4,097,092 | 6/1978 | Lapple. |
| 4,194,656 | 3/1980 | Zufich. |
| 4,429,428 | 2/1984 | Van Dyk. |
| 4,498,659 | 2/1985 | Brockelsby, III. |
| 4,726,564 | 2/1988 | Lynn. |
| 4,850,569 | 7/1989 | Griffioen et al.. |
| 4,865,092 | 9/1989 | Reichelt. |
| 4,934,662 | 6/1990 | Griffioen et al.. |
| 4,949,889 | 8/1990 | Carson. |
| 4,953,862 | 9/1990 | Uke et al.. |
| 4,990,033 | 2/1991 | Handley et al. ............... 254/134.4 |
| 5,000,661 | 3/1991 | Bloch et al.. |
| 5,118,226 | 6/1992 | Horii et al.. |

(List continued on next page.)

FOREIGN PATENT DOCUMENTS 587575  3/1977  Switzerland.

OTHER PUBLICATIONS

Brochure including kit descriptions and price list (Mar. 23, 1994).

Primary Examiner—Robert C. Watson
Attorney, Agent, or Firm—Staas & Halsey

[57] ABSTRACT

A line shooting air gun that carries a line down a conduit by creating a turbulent air flow in the conduit that keeps the line away from the drag inducing conduit sides. The turbulent air flow is created by a valve body that reflects the air flow a number of different times, uses at least two chambers for compression and reflection, provides an unbalanced flow of air and angles the air flow around a venturi breaking up any smooth flow. The line is carried by the turbulent air flow. An air drag system creates a serpentine line path producing drag on the line preventing line tangling when the air flow changes. A nozzle fitting allows different size adapters for different size conduits to be attached. A backpack with a rigid frame is provided for carrying an air tank. The rigid frame forms a stand for the tank when the backpack is not being carried. The frame includes a width plate that adjusts the width of the backpack shoulder harness to the user. The frame also includes a weight balancing mechanism that tilts the load forward to balance the load on the user.

6 Claims, 5 Drawing Sheets

U.S. PATENT DOCUMENTS

| | | |
|---|---|---|
| 5,121,644 | 6/1992 | Grey et al. . |
| 5,127,630 | 7/1992 | Oestreich . |
| 5,181,271 | 1/1993 | Jenkins . |
| 5,197,715 | 3/1993 | Griffioen . |
| 5,246,207 | 9/1993 | Horii et al. ............................ 254/134.4 |
| 5,362,022 | 11/1994 | McLoughlin et al. . |
| 5,374,034 | 12/1994 | Flores, Sr. et al. . |
| 5,467,968 | 11/1995 | Proud et al. ............................ 254/134.4 |

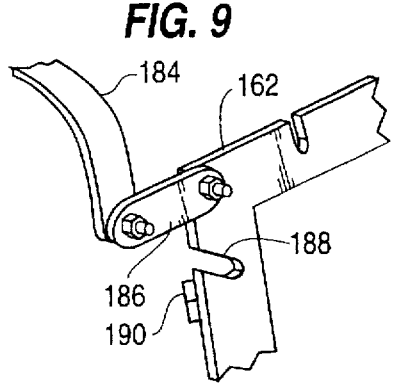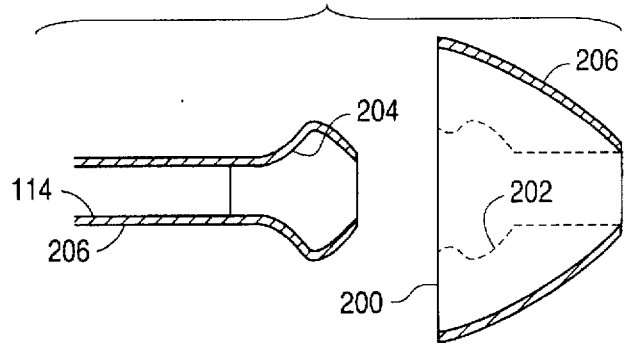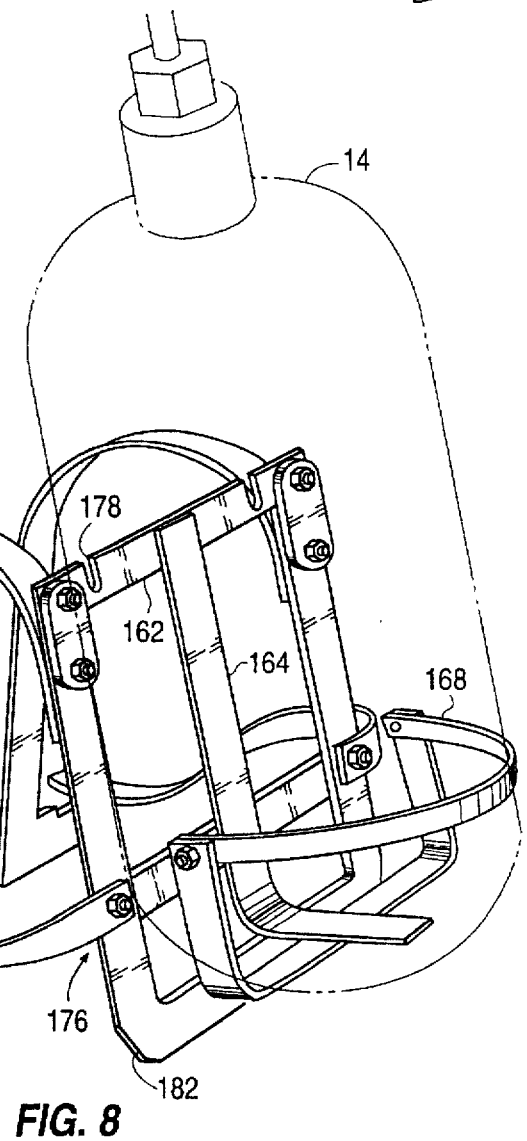

APPARATUS FOR SENDING A LINE THROUGH A CONDUIT

BACKGROUND OF THE INVENTION

1. Field of the Invention

The present invention is directed to an apparatus that sends a line through a conduit and, more particularly, to a gun that creates a turbulent, refracted wave type air flow in a conduit to carry a line through the conduit with the line being slowed as necessary by an air drag system and with the air supply tank being carried by a self adjusting backpack.

2. Description of the Related Art

Electrical wires in commercial buildings must be run through an electrical conduit that can vary in diameter from about 0.5 inches to more than 6 inches. These conduits can range in length from about a dozen feet to several thousand feet. The conduits can include several turns or bends of varying angles with the typical conduit run including no more than about four ninety degree turns. For short conduit runs, devices exist that can blow a line through the conduit using compressed air or pull the line through the conduit using a vacuum. These devices include a line carrier or a mouse to which the line is attached. The mouse travels through the conduit and the line is dragged along by the mouse. In situations where the runs are very long and have a number of turns conventional wisdom is that a mouse is required. This is because screw couplers are typically used to join sections of the conduit and air pressure is lost at every joint. In situations where a mouse is used and even when the mouse fits snugly within the conduit, when the run is long (for example, more than eighty feet), the mouse will frequently get stuck requiring that the line and mouse be withdrawn from the conduit and another shot taken or fish tape be used to snag the line carrier to complete the run. This is very labor intensive and, as a result, very costly. In some situations where the conduit is long and there are a number of turns, it is impossible to get the line through the conduit and the conduit must be left in shorter uncoupled sections and the line shot through the sections in separate operations. The principal reasons that the line gets stuck are the friction of the line with the sides of the conduit and the loss of air pressure from the couplings. These problems are even more pronounced for large diameter conduits.

What is needed is a system that will carry a line through a long conduit, more than eighty feet in length with more than four and up to eighteen turns of ninety degree each, without requiring a mouse and such in a way that the line does not substantially contact the sides of the conduit.

SUMMARY OF THE INVENTION

It is an object of the present invention to float a line through a conduit by creating a turbulent air flow in the conduit.

It is another object of the present invention to carry a line through a conduit having a length of more than eighty feet and at least two thousand feet without using a line carrier or mouse.

It is also an object of the present invention to carry a line through a conduit that has more than four and at least eighteen ninety-degree turns without using a mouse.

It is an object of the present invention to provide a line carrying method which will operate in a conduit that includes existing wire.

It is another object of the present invention to provide a refracted wave fluid flow within a conduit to aerodynamically assist the line in propagating around curves and over a long distance.

It is a further object of the present invention to provide a nozzle for a line gun that is adaptable to conduits of varying sizes.

It is still another object of the present invention to provide a line discharge apparatus that includes an air drag system that slows the line down preventing tangling of the line when the air flow is stopped or accelerated.

It is an additional object of the present invention to provide a backpack for a line gun that is self adjusting as to width and weight balance.

It is an object of the present invention to provide a line gun system that is portable and easy to carry when climbing ladders, scaffolds, etc. on a job site.

The above objects can be attained by an apparatus or an air gun that carries a line down a conduit by creating a turbulent or refracted wave type air flow in the conduit, so that the line floats or is carried down the conduit with minimal contact with the sides of the conduit. The turbulent air flow is created by a valve body that includes at least two chambers, turns or reflects the air flow a number of different times breaking up any smooth flow. The air exiting around a venturi in a nozzle is angled and unbalanced, further creating turbulence. The line is carried out of the venturi by the turbulent air flow. The gun also includes an air drag system that distorts the line path within the venturi so that a drag is created on the line preventing the line from tangling or building up in a blockage when the air flow stops or accelerates. A nozzle of the gun includes a fitting that allows different size adapters for different size conduits to be attached to the gun. A backpack with a rigid frame is provided for carrying an air tank supplying air to the gun, thereby providing an air gun system that is portable. The rigid frame forms a stand for the tank and includes a width plate that adjusts the width of the backpack shoulder harness to the user. The frame also includes a weight balancing mechanism that tilts the load forward to balance the load on the user.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 8 illustrates a backpack frame according to the present invention;

FIG. 9 depicts a width self adjusting mechanism of the frame; and

FIG. 10 illustrates a nozzle and a conduit adapter.

DESCRIPTION OF THE PREFERRED EMBODIMENTS

Figure 1:
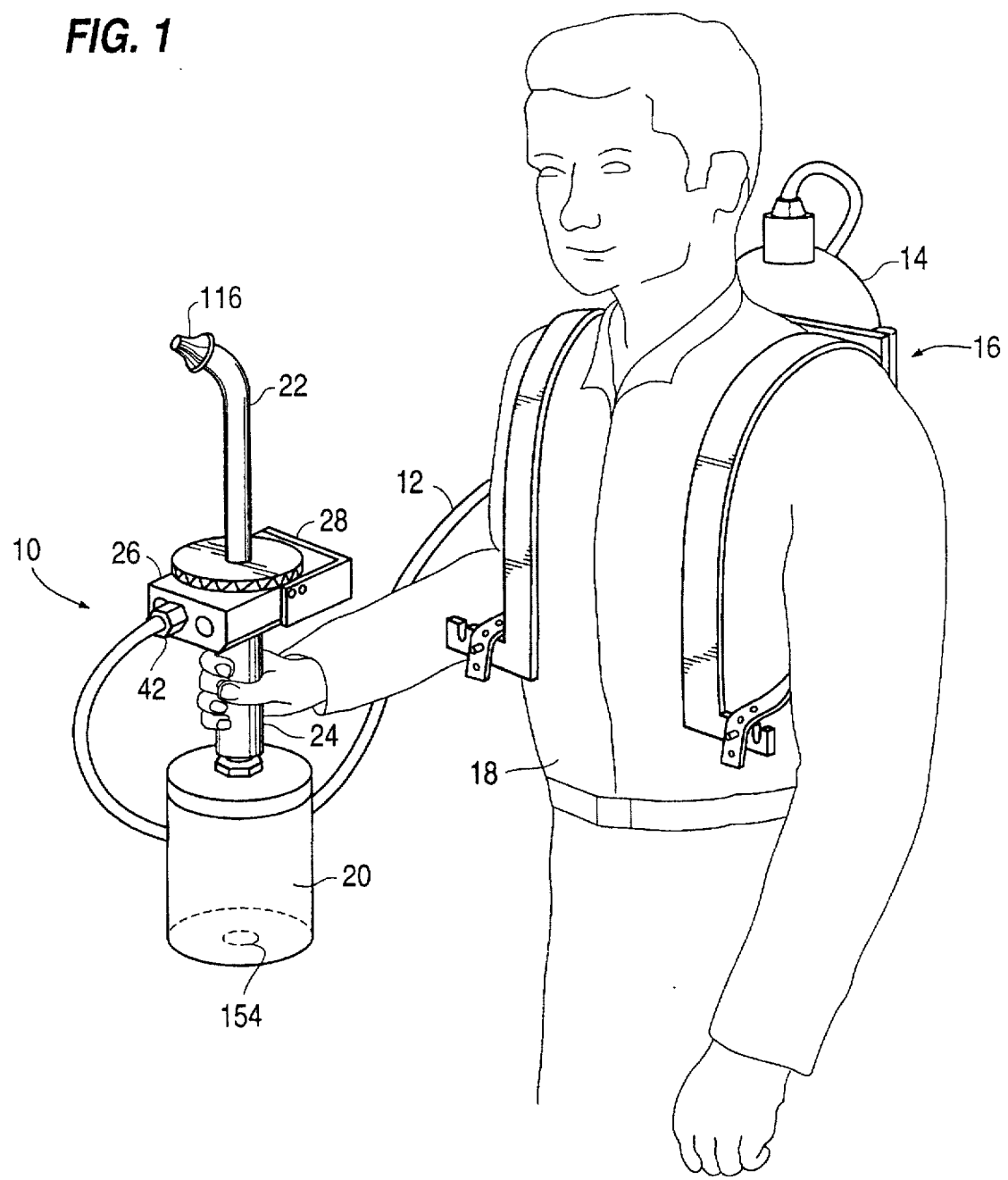
FIG. 1 depicts an air gun 10 with a line container 20 and a backpack 16 according to the present invention.

The present invention, as illustrated in FIG. 1, includes an air gun apparatus 10 attached by an air hose 12 to an air tank 14 carried by a backpack 16 on a user 18. The air tank 14 typically includes air that is pressurized to about 700 psi at 70° F. Air flows through the hose 12 to the gun 10 causing a line (not shown), typically made of a polypropylene fiber bundle and contained in a skein in a line can 20, to be discharged from a nozzle 22 of the gun 10 into a conduit (not shown). The line can also be solid, such as fishing line or optical fiber or can be with a non-round shape, such as the flat shape of fish tape. The line can also be from about the size of fishing line to about 0.25 inches in diameter. The line exits the can 20, travels through a handle 24 and is carried through the conduit, even when the conduit includes previously installed wire runs, by a turbulent wave like flow of air primarily created in a valve body 26 of the gun 10.

Figure 2:
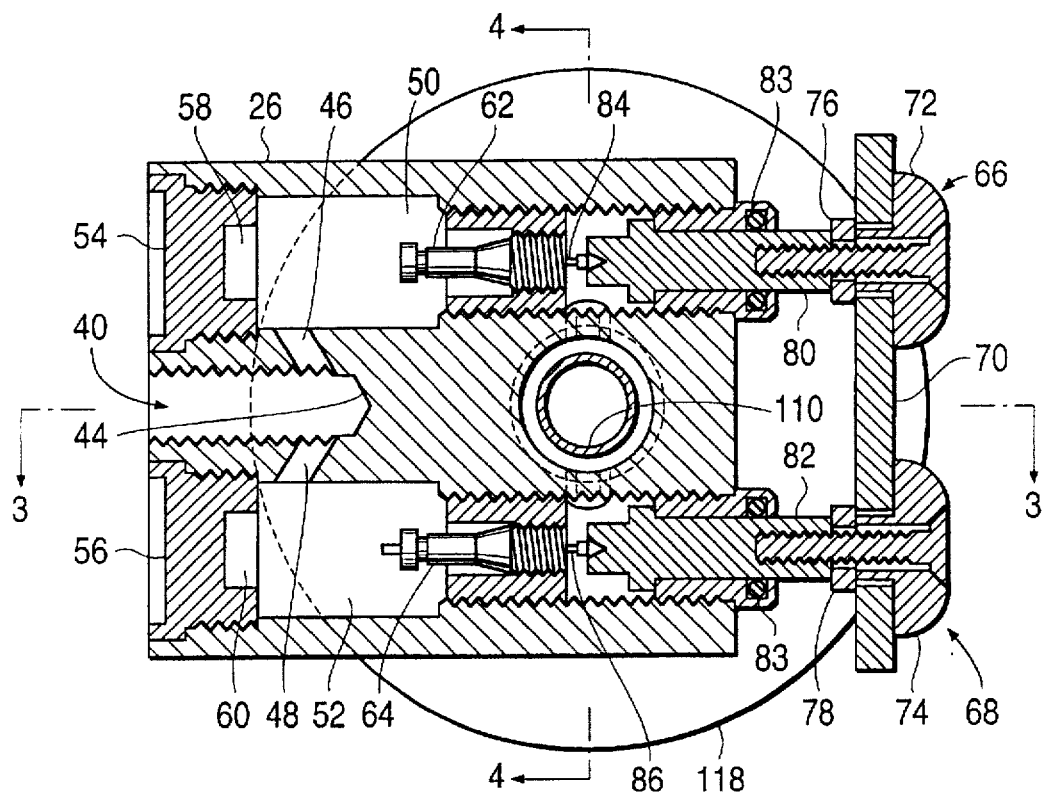
FIGS. 2–4 are views of a two chamber valve body 26 according to the present invention.
Figure 3:
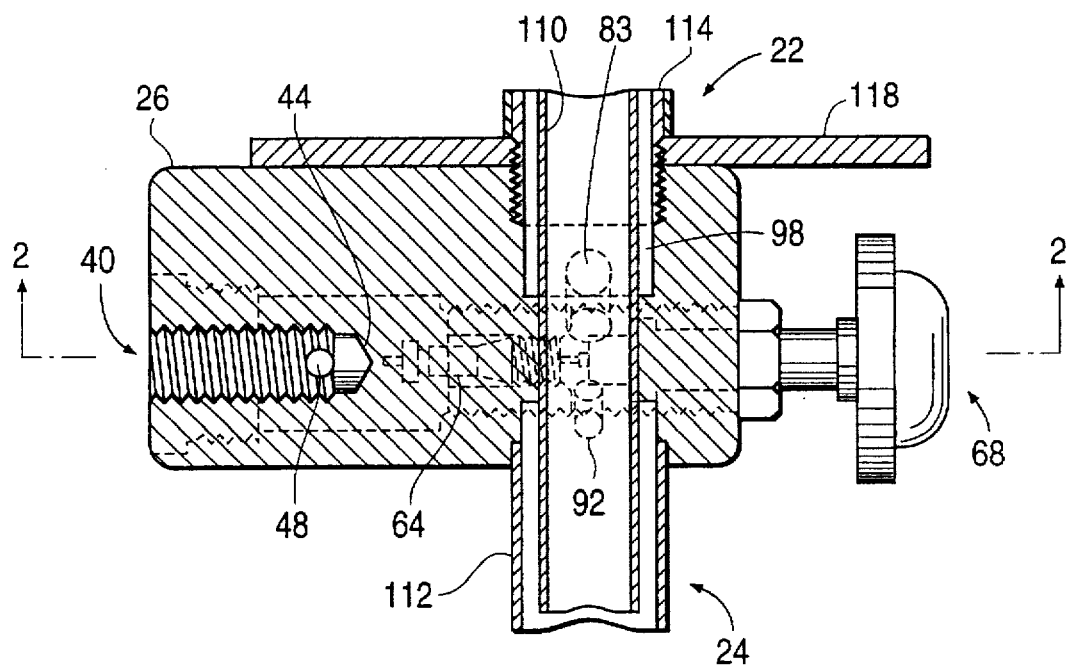
Figure 4:
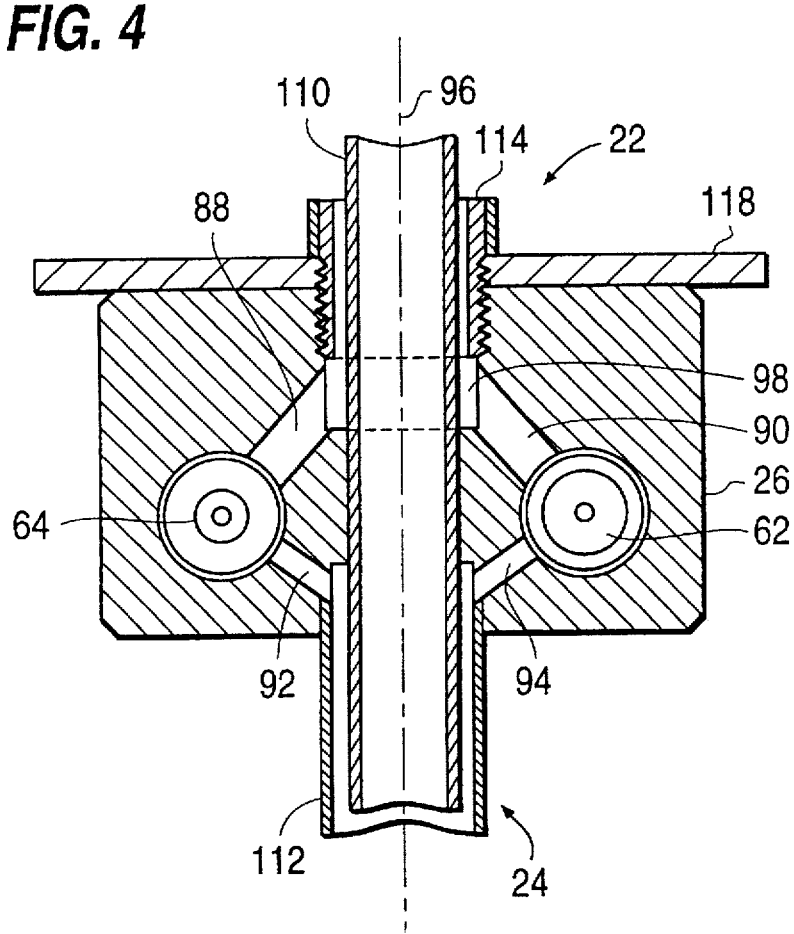

The valve body 26 is typically made of a metal, such as steel, and is machined using conventional machining techniques and tools. The body 26 includes, as illustrated in FIGS. 2–4, an air inlet 40 into which the air hose 12 fits via a coupler 42 shown in FIG. 1. The inlet 40 (FIG. 2) includes an angled or V-shaped back wall 44 that reflects or refracts the air from the hose 12 starting to break up the smooth flow of air from the hose 12. The air leaves the inlet 40 through two air tubes or channels 46 and 48 that create two air flow streams and that direct the air in a direction somewhat backward from the flow direction of the inlet 40. This redirection adds to the turbulence. The air from the channels 46 and 48 enters a pair of corresponding chambers 50 and 52 where the air flow encounters chamber plugs 54 and 56 typically made of a metal, such as brass. The plugs 54 and 56 include corresponding refraction holes 58 and 60 that further redirect the air and create further turbulence. The drawings show only two chambers and two air paths, however, additional air chambers and paths can be used and very large conduits are more efficiently traversed by a line when four valved chambers are used. The air is reflected by the plugs 54 and 56 toward air valves 62 and 64. The valve 62 is preferably the type used for Freon flow control and is larger than the valve 64. Valve 64 is preferably an aircraft type air valve. The different size valves 62 and 64 create an imbalance in the volume of air flow that creates further turbulence when the two streams are rejoined. Valve activation is controlled by two valve buttons 66 and 68 which can be operated independently or together. The valve buttons 66 and 68 are activated together by pressing a button tie plate 70 (not shown in FIG. 3) that floats between the tops 72 and 74 of the buttons and plate block ledges 76 and 78 that are attached to button plungers or stems 80 and 82. The button stems 80 and 82, sealed by conventional O-rings 83 to prevent air leakage, contact release pins 84 and 86 of the valves 62 and 64 when the buttons 66 and/or 68 are depressed. Accidental activation is prevented by a button guard 28 (see FIG. 1) that shields the buttons from impact. The air discharged from the valves 62 and 64 enters a pair of corresponding forward flow air tubes or channels 88 and 90 or a pair of corresponding reverse air flow tubes or channels 92 and 94. The channels 88 and 90 are angled at preferably about forty-five degrees from the long axis 96 of the gun 10 created by the handle 24 and the nozzle 22. The channels 88 and 90 discharge the air toward the nozzle 22 and the front of the gun 10. This angle creates further turbulence in the air flow. The angle of the channels 92 and 94 is preferably at about sixty degrees with respect to the axis 96 and the channels 92 and 94 discharge the air toward the handle 24. The air from the channels 88 and 90 enters a nozzle chamber 98 where the two or more flow paths rejoin if multiple valves are activated. A venturi tube 110 made of a metal, such as aluminum, passes through the chamber 98 and into the nozzle 22. The turbulent air tends to swirl around the venturi tube 110 as it exits toward the nozzle 22 creating a turbulent type refracted wave flow. The venturi tube 110 is press fit into the valve body 26 and extends backward through the handle 24 to the can 20 and forward preferably about three inches into the nozzle 22. The handle 24 includes an air flow tube 112 made of a metal, such as aluminum, and which is also press fit into the body 26. The air flow tube 112 surrounds the venturi tube 110 in the handle 24. The nozzle 22 includes an air flow tube 114, also made of a metal, such as aluminum, surrounding the venturi tube 110 and which extends to a conduit fitting 116 (see FIG. 1). The turbulent flow passing the end of the venturi tube 110 pulls the line, as well as, the air from the venturi tube 110, into the tube 114. The air flow tube 114 of the nozzle 22 is threaded into the body 26 and adjustably held in position by a knurled lock nut 118. The lock nut 118, when loosened, allows the direction that the nozzle 22 points to be turned by 360°. The line from the can 20 flows along the axis 96 from the handle 24 to and out of the nozzle 22 and the line is floated or carried in the turbulent refracted type air flow that is created. The turbulent air flow proceeds down the conduit carrying the line with it.

A drag on the line to keep it from tangling at the entrance to the handle 24 when the valves 62 and 64 are shut after a significant air discharge can be created in a number of different ways. A mechanical drag system can be added to the gun 10. This raises the complexity and cost of the gun 10. The line can be stiffened by soaking it in a stiffening solution, such as starch. The stiffening of the line causes the line to unravel from the skein more slowly. The line can also be detachably bound to the skein by a binding agent, such as a sugar solution, in which the skein is soaked and which causes the line to tend to stick to the skein as it unravels. Reduction in static electricity creation which slows line travel can be effected by soaking the skein in a static reduction solution, such as sulfonic acid. The gun can also be equipped with an air drag system that puts a drag on the line exiting from the nozzle 22. Or a combination of the agents and the air drag system can be used when needed.

Figure 7:
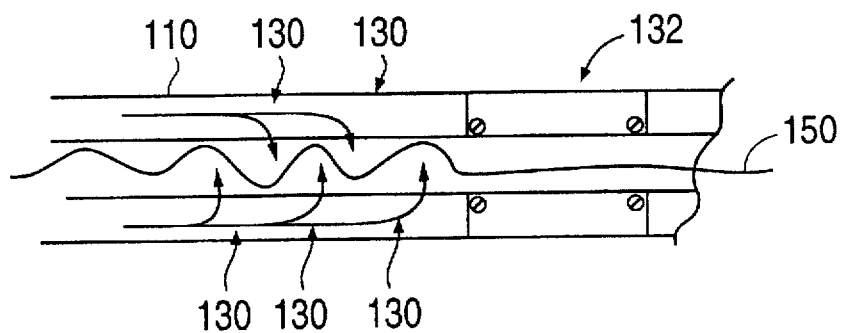
FIG. 7 depicts operation of the air drag.
Figure 5:
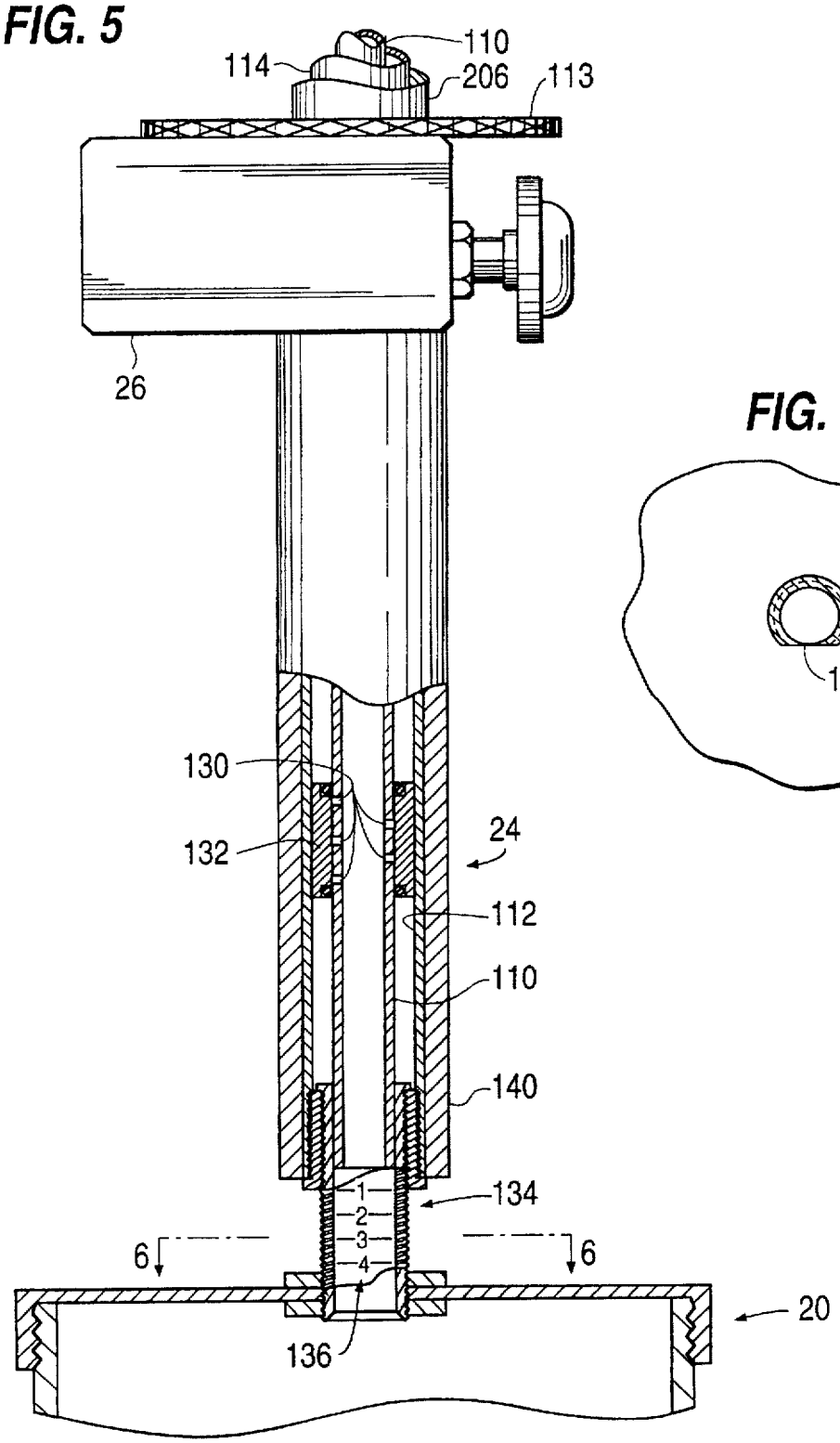
FIG. 5 illustrates an air drag system of the present invention.
Figure 6:
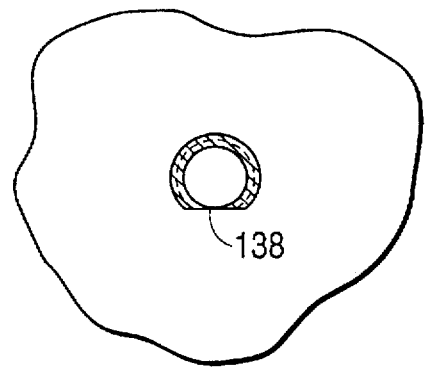
FIG. 6 depicts a plane of the drag indicia.

The air drag system is preferably included in handle 24, as illustrated in FIG. 5. The air drag is created by air flowing from channels 92 and 94 (see FIG. 4) down tube 112 around the venturi tube 110 and through offset holes 130 in the venturi tube 110. The holes 130, as shown, are on opposite sides of the venturi tube 110, however, the holes can be arranged in other patterns, such as a staggered spiral. The amount of air flowing through tube 112 and through holes 130 is regulated by a seal 132 between the tubes 110 and 112 and which is press fit into tube 112. The seal 132 includes O-rings that prevent air from flowing by the seal 132 and allow the tube 110 to slide pass the seal 132. To activate the air drag the venturi tube 110 is adjusted within the tube 112 to expose the holes 130 to the air on the body 26 side of the seal 132. The venturi tube 110 is press fit to a threaded adjuster 134 which when turned moves the venturi tube 110 back and forth within the tube 112, so that the holes 130 can be covered by the seal 132 or exposed one at a time. The adjuster 134 includes a locking sleeve that prevents it from being propelled out of the handle. The adjuster 134 includes drag indication marks 136 made on a planar surface 138 of the adjuster 134, as illustrated in FIG. 6. The air drag system works by causing the line 150 to be pushed to the sides of the venturi tube 110 by the air flowing through the holes 130 creating a serpentine path for the line 150, as illustrated in FIG. 7. The serpentine path puts a drag on the flow of the line 150. The wave like form of the line 150 also helps the line travel through the conduit with minimal side wall contact. Surrounding the tube 112 can be a foam rubber pad 140 that allows the user to comfortably grip the handle 24.

The can 20 can be made of any material but transparent plastic is preferred, so that the amount of line remaining on the skein can be visually determined. The can 20 includes an air hole 154 (see FIG. 1) that allows air to flow through the can 20 and into the venturi 110 of the gun 10.

The backpack 16, as illustrated in FIG. 8, includes a relatively rigid frame 160 made from a metal, such as aluminum, or a relatively stiff composite, such as fiberglass. The rigidity of the frame 160 allows the frame 160 to act as a stand for the tank which supports the tank in a vertical position when the frame 160 is set on the ground. The frame 160 can also serve as a seat for the user during rest periods or when working on parts on the ground. The frame 160 includes a rack 162 to which an L-shaped supporting member 164 is attached. The weight of a load, such as tank 14, is held by a bracket 168 attached to an outwardly extending portion of the member 164. The extending portion acts as a stiff spring and absorbs some of the momentum of the load, such as the heavy air tank 14, as the user moves about. The frame 160 is secured front to back by an adjustable strap 170 that includes pin holes 172 with grommets (not shown). The pin holes 172 fit over a pin 174 of the frame 160. The strap 170 is secured to the rear part of the frame at an attachment point 176. The strap fits into a strap slot 173 which will also accommodate the strap grommets. The pin 174 is located vertically lower than the attachment point 176, as measured from the top of the frame and results in the strap angling downward from the attachment point 176 to the pin 174. When the strap 170 engages the pin 174, this downward sloping causes the weight of the load to be transferred forward in the frame 160, so that some of the weight is transferred to the chest of the user creating a more balanced load. The frame 160 also includes notches 178 and 180 upon which the gun 10 or other tools can be hung, freeing the user's hands. The frame 160 can include pads on the inner surface that allow the frame 160 to rest more comfortably on the user's shoulders. If pads are provided, the frame 160 should include notches along the bottom edge for pad straps that allow the frame 160 to rest on the ground without resting on and damaging the pad straps. The frame 160 includes a lower member 182 that is angled away from the user's back below the small of the back to provide lower back strain relief.

The frame 160 also includes an automatic shoulder harness width adjustment mechanism as is illustrated in more detail in FIG. 9. As illustrated, the back rack 162 is attached to a shoulder strap 184 of the frame 160 by a pivoting plate 186. The plate allows the strap 184 to move inward and outward of the rack 162, thereby adjusting the distance between the shoulder straps of the shoulder harness. The rack 162 includes a slot 188 with a locking block 190 which frictionally binds the strap 184 in the closed position when the width adjustment is not being used and particularly when the backpack 16 is used as a stand or a seat. The plate 186 is held spaced away from the strap 184 by a spacer (not shown) that allows the spacer to fit within slot 188 when the mechanism is closed.

The present invention also includes an adapter 200 which allows the gun 10 to send line through conduits of various sizes. This adapter 200 is illustrated in FIG. 10 and comprises a metal body having a snap fit coupling mechanism 202. The nozzle 22 includes a fitting 204 which is press to the air flow tube 114. The fitting 204 has an outer shape, much like a nipple with an annular front surface, that reflects the inner shape of the coupling 202. The fitting 204 and tube 114, as well as the adapter 200, are covered by a vulcanized layer 206 that allows the fitting 204 to snap into and snugly fit the coupler 202. The layer 206 is preferably PLASTISOL which is generally soft allowing the nozzle 22 or adapter 200 to conform to the end of a conduit under minimal pressure. A single size adapter 200 is shown. However, the adapter could be of any size appropriate for the target conduit.

A continuously variable size adapter can be created by securing an inflatable tube to the fitting 204. The inflatable tube would be inflated to the size required to seal the target conduit.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A line apparatus for sending a line through a tube, comprising:

an air nozzle coupled to the tube;

a line passageway associated with the air nozzle and through which the line passes; and an air valve body controlling air flow in the air nozzle and producing a turbulent flow of air in the air nozzle and flowing into the tube with the turbulent air flow carrying the line down the tuber, said air valve body comprising an air flow path which reflects the air from direction changing surfaces, said air flow path comprising:

a wall reflecting the air;

a reverse direction channel reversing a direction of the air reflected from said wall;

a valve entrance chamber including a reflection plug reflecting the air;

a valve passing the air reflected from the plug when open; and an angled air channel angled with respect to a long axis of the air nozzle and passing air from the valve to the nozzle.

2. A line apparatus for sending a line through a tube, comprising:

an air nozzle coupled to the tube;

a line passageway associated with the air nozzle and through which the line passes; and an air valve body controlling air flow in the air nozzle and producing a turbulent flow of air in the air nozzle and flowing into the tube with the turbulent air flow carrying the line down the tube, said air valve body splitting air flow into unbalanced volume air flow paths.

3. An apparatus as recited in claim 2, wherein said air valve body includes air valves of different flow capacities associated with the air paths.

4. An apparatus as recited in claim 2, wherein said line passageway comprises a venturi tube centered in said nozzle and said air valve body joins the air paths around said venturi tube.

5. A line apparatus for sending a line through a tube, comprising:

an air nozzle coupled to the tube;

a line passageway associated with the air nozzle and through which the line passes; and an air valve body controlling air flow in the air nozzle and producing a turbulent flow of air in the air nozzle and flowing into the tube with the turbulent air flow carrying the line down the tube, said valve body including at least two air chambers.

6. A line apparatus for sending a line through a tube, comprising:

an air tank air source providing a flow of air;

an air nozzle coupled to the tube;

an air valve body coupled to said source, controlling air flow in the air nozzle and producing a turbulent flow of air in the air nozzle and flowing into the tube with the turbulent air flow carrying the line down the tube, said air valve body comprising air flow paths which reflect the air from direction changing surfaces, each air flow path comprising:

a wall reflecting the air;

a reverse direction channel reversing a direction of the air reflected from said wall;

a valve entrance chamber including a reflection plug reflecting the air;

a valve passing the air reflected from the plug when open, each path having a different flow capacity of the valve; and an angled air channel angled with respect to a long axis of the air nozzle and passing air from the valve to the nozzle;

a venturi tube centered in said nozzle and said air valve body joining the air paths around said venturi tube, the line flowing through said venturi and said venturi having air holes through which the air flows against the line creating a drag on the flow of the line; and a backpack, comprising:

a rigid frame; and an L-shaped spring member carrying said air tank air source.

* * * * *